United States Patent
Nakamura et al.

(10) Patent No.: US 6,695,939 B1
(45) Date of Patent: Feb. 24, 2004

(54) METHOD OF PRODUCING INTERIOR TRIM MATERIAL

(75) Inventors: Tetsuya Nakamura, Kariya (JP); Shuji Ogura, Kariya (JP); Shuichi Kato, Kariya (JP)

(73) Assignee: Toyoda Boshoku Corporation, Kariya (JP)

( * ) Notice: Subject to any disclaimer, the term of this patent is extended or adjusted under 35 U.S.C. 154(b) by 196 days.

(21) Appl. No.: 09/702,839

(22) Filed: Nov. 1, 2000

(30) Foreign Application Priority Data

Nov. 4, 1999 (JP) .......................... 11-313614

(51) Int. Cl.[7] .............................. B32B 31/04
(52) U.S. Cl. .................. 156/62.8; 156/222; 156/309.6; 156/309.9
(58) Field of Search ................ 156/62.8, 221, 156/222, 224, 308.2, 309.6, 580, 583.1, 581, 309.9

(56) References Cited

U.S. PATENT DOCUMENTS 3,865,661 A * 2/1975 Hata et al. .................... 156/79
4,035,215 A * 7/1977 Goldstone ................... 156/245
5,055,341 A * 10/1991 Yamaji et al. ............... 428/174
5,068,001 A * 11/1991 Haussling ................... 156/222

FOREIGN PATENT DOCUMENTS

JP          A-8-80601       9/1994
JP          A-10-315396     5/1997

* cited by examiner

Primary Examiner—Jeff H. Aftergut
Assistant Examiner—Barbara J Musser
(74) Attorney, Agent, or Firm—Oliff & Berridge, PLC

(57) ABSTRACT

In a method of producing an interior trim material, a laminated structure is formed by laminating a skin material, a mat-like fiber structure, and a high-melting-point fiber sheet in this order. The mat-like fiber structure is prepared by blending thermoplastic fibers and inorganic fibers, and the high-melting-point fiber sheet is formed from fibers having a melting point higher than that of the thermoplastic fibers. At least the mat-like fiber structure is heated so that the thermoplastic fibers are melted. The laminated structure is then compressed under pressure by a hot press machine, and then expanded to restore at least part of the thickness thereof. The laminated structure thus expanded is then formed into a certain shape by a cold press machine, while the thermoplastic fibers of the mat-like fiber structure maintains plasticity.

18 Claims, 3 Drawing Sheets

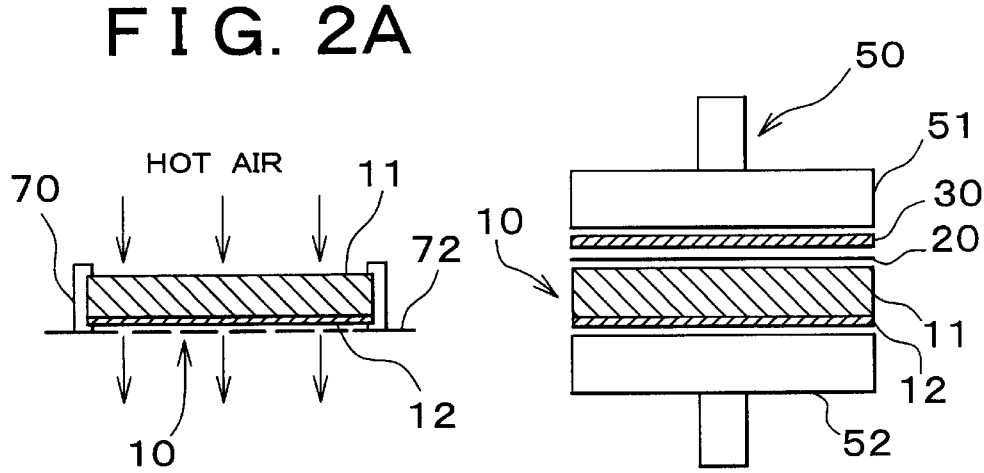
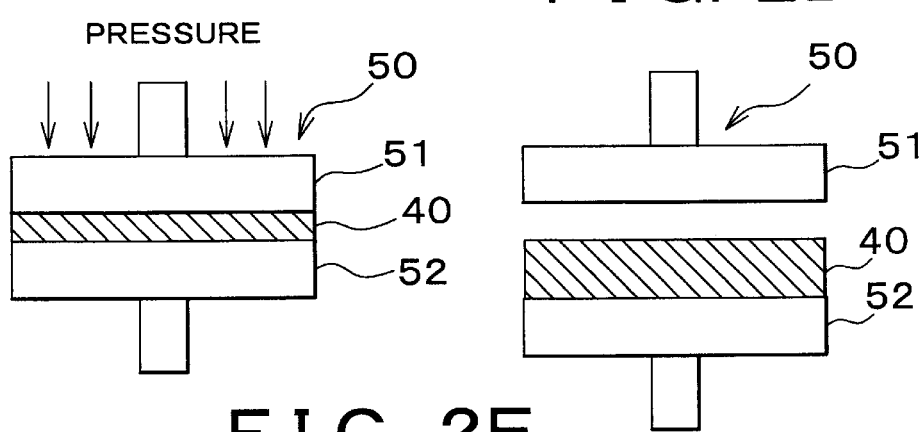
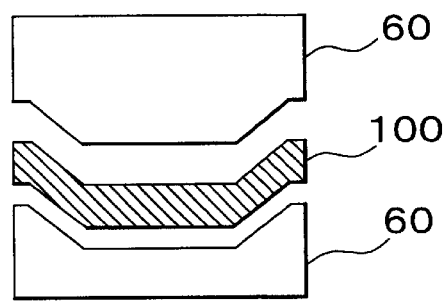

METHOD OF PRODUCING INTERIOR TRIM MATERIAL

INCORPORATION BY REFERENCE

The disclosure of Japanese Patent Application No. 11-313614 filed on Nov. 4, 2000 including the specification, drawings and abstract is incorporated herein by reference in its entirety.

BACKGROUND OF THE INVENTION

1. Field of the Invention

The present invention relates to a method of producing an interior trim material. More particularly, the present invention relates to a method of producing an interior trim material, such as a ceiling materials or a door trim for use in automobiles, in which a skin material is bonded to a substrate,.

2. Discussion of Related Art

Conventionally, an interior trim material comprised of a rigid substrate and a skin material bonded to at least one surface thereof has been widely used in the interior or vehicle compartment of an automobile.

In this case, inorganic fibers and thermoplastic fibers are mainly used for producing the substrate. The inorganic fibers provide certain rigidity and dimensional stability, and the thermoplastic fibers provide certain formability, while the skin material provides a certain design quality.

A known example of method (hereinafter referred to as "known method 1") of producing an interior trim material having the above-described substrate and the skin material bonded to the surface thereof includes three processes, i.e., a process of producing a substrate, a process of tentatively bonding a skin material to the substrate, and a forming process.

In the substrate production process of the known method 1, the substrate is prepared by laminating a thermoplastic resin film or films onto either one or both of the opposite surfaces of a mat-like fiber structure mainly formed from inorganic fibers containing thermoplastic fibers. This substrate is then fed onto an endless belt formed from a Teflon sheet that is bonded to the substrate when the thermoplastic resin film is in a molten state but not bonded thereto when the same film is not in a molten state, and is then heated in a furnace.

Subsequently, the substrate thus heated is compressed under pressure by a pressing portion on the endless belt so that the mat-like fiber structure is impregnated with the thermoplastic resin film. At the same time, the inorganic fibers contained in the mat-like fiber structure are firmly bonded together by means of the thermoplastic fibers contained in the mat-like fiber structure. The substrate thus compressed under pressure is thereafter naturally or forcibly expanded so as to restore its original thickness, and the cooled at a cooling portion on the endless belt. In this manner, a substrate is produced in which inorganic fibers are bonded together by thermoplastic resin and thermoplastic fibers.

In the next process of bonding the skin material, the substrate produced in the above step is cut into a suitable size, and a skin material is laminated on the cut piece of the substrate, and locally melted by heat so as to be tentatively bonded to the substrate.

Finally, in the forming process, the substrate to which the skin material has been tentatively bonded is reheated in the furnace so that the thermoplastic fibers and thermoplastic resin are melted. A cold press machine is then used to form the substrate with the skin material into a desired shape, thereby to provide an interior trim material consisting of the substrate and the skin material bonded to the substrate.

Japanese Patent Laid-Open Publication No. HEI 8-80601 discloses a method in which a skin material as well as a substrate is fed onto an endless belt in the substrate production process as described above, thereby eliminating the process of tentatively bonding the skin material to the substrate, and a flat composite sheet with the skin material can be produced in a single process step.

According to a method of producing an interior trim material as disclosed in Japanese Patent Laid-Open Publication No. 10-315396 (hereinafter referred to as the "known method 2"), a mat-like fiber structure formed from thermoplastic fibers and glass fibers is prepared, and hot air having a temperature high enough to melt the thermoplastic fibers is caused to pass through the fiber structure from the front side to the back side thereof, thereby providing a substrate in which the density distribution of the thermoplastic resin has been thus varied. Then, a skin material with thermoplastic resin formed on its back surface, which has been heated such that the thermoplastic resin is given certain plasticity, is laminated on a surface of the substrate provided in the above manner. The thus laminated skin material and substrate are then formed into a desired shape by press molding using a forming die, so as to form a substrate in which the glass fibers are bonded together by thermoplastic fibers, while at the same time bonding the skin material to the substrate, thereby to produce an interior trim material.

In the known method 1 as described above, the substrate is heated in the furnace so that the thermoplastic fibers and thermoplastic resin are melted, and the substrate thus heated is compressed under pressure so that the inorganic fibers are firmly bonded together by the thermoplastic fibers and thermoplastic resin, whereby the resulting substrate is given rigidity.

In the known method 1, a series of steps included in the substrate production process are carried out by use of the endless belt. This eliminates such a problem that melted thermoplastic resin sticks to local parts of a press mold or die, or the like, when the substrate is compressed under pressure, resulting in a failure to transport the substrate to the following process step. Thus, the substrate can be favorably produced with high reliability and efficiency.

The endless belt used in the known method 1, however, is required to have sufficiently high heat resistance, durability, and rigidity, and therefore cannot be suitably used for forming interior trim materials having complicated shapes. Thus, in the process step of impregnating the mat-like fiber structure with the thermoplastic resin film, the heated substrate material is compressed under pressure, only to be formed into the shape of a flat plate or sheet. Namely, the substrate can be formed only in the shape of a flat plate or sheet.

In order to form a substrate into a desired shape other than the flat shape, therefore, it is necessary to re-heat the substrate to soften the thermoplastic fibers and thermoplastic resin, so as to form the substrate into the desired shape in another process without using an endless belt, for example, in the forming process of the known method 1. If the substrate, in which organic fibers have been firmly bonded together by thermoplastic resin and thermoplastic fibers through the process of impregnating the substrate with the thermoplastic resin, is reheated, however, the bonding strength of the fibers in the substrate is weakened, and the strength of the resulting substrate is reduced. If the density (mass per unit area) of the substrate is increased so as to ensure a required strength of the substrate, the weight of the substrate may be undesirably increased, and the production cost may also be undesirably increased.

In the known method 2 as described above, on the other hand, only one heating step is required in the whole manufacturing process beginning with the production of the substrate and ending with the production of the interior trim material to which the skin material is bonded.

In the method as described above, the substrate through which hot air has been passed and the skin material backed with the melted thermoplastic resin and laminated on the substrate are formed directly into a desired shape using a suitable die. In order to provide sufficiently high bonding strength with the skin material by impregnating the substrate with the backing resin, the die clearance of the forming die needs to be reduced. This may result in a reduction in the substrate thickness, and insufficient rigidity due to the reduced substrate thickness. If the die clearance of the forming dies is increased, on the contrary, the compressing force may be reduced, resulting in insufficient bonding of inorganic fibers by use of the thermoplastic fibers contained in the substrate. It is thus difficult or impossible to provide sufficiently high rigidity of the substrate through the bonding of the inorganic fibers, and provide sufficiently high bonding strength with the skin material.

SUMMARY OF THE INVENTION

It is therefore an object of the present invention to provide a method of producing an interior trim material, which makes it possible to easily produce an interior trim material including a substrate with sufficient rigidity and a skin material bonded to the substrate, by carrying out simple process steps.

The inventors of the invention have found, as a result of studies, that the substrate and the skin material may be compressed under pressure by means of a flat type hot press machine while the thermoplastic resin is being melted, so as to assure sufficiently high bonding strength of the skin material bonded to the substrate while assuring sufficiently high rigidity of the substrate.

The inventors have also found that in order to produce an interior trim material having a desired shape while assuring sufficient rigidity of the substrate, the substrate and the skin material that have been compressed under pressure by the flat type hot press machine may be expanded to restore its original thickness, and then formed into the desired shape by a cold press machine while the thermoplastic resin is being softened.

The inventors have also found that in order to prevent thermoplastic fibers contained in the substrate from sticking or adhering to the flat type hot press machine while the substrate and skin material are compressed under pressure by means of the hot press machine, the substrate may be constructed such that a high-melting-point fiber sheet composed of high-melting-point fibers is to be located in contact with the hot press machine.

On the basis of the above findings, the inventors have developed the present invention, which provides a method of producing an interior trim material, comprising the steps of: forming a laminated structure by laminating a skin material, a mat-like fiber structure, and a high-melting-point fiber sheet on each other to be arranged in this order, the mat-like fiber structure being prepared by blending thermoplastic fibers and inorganic fibers, the high-melting-point fiber sheet comprising high-melting-point fibers having a melting point higher than that of the thermoplastic fibers of the mat-like fiber structure, at least the mat-like fiber structure being heated such that the thermoplastic fibers are melted; compressing the laminated structure under pressure by a hot press machine; expanding the laminated structure that has been compressed, so as to restore at least part of the thickness thereof; and forming the laminated structure into a certain shape by a cold press machine, while the thermoplastic fibers of the mat-like fiber structure maintains plasticity.

In short, the present invention is concerned with a method of producing an interior trim material having a substrate and a skin material bonded integrally to the substrate, wherein the substrate comprises a mat-like fiber structure prepared by blending thermoplastic fibers with inorganic fibers, and a high-melting-point fiber sheet.

In the method of producing an interior trim material according to the present invention, the substrate includes two layers, i.e., the mat-like fiber structure and the high-melting-point fiber sheet, the latter being one constituent element of the substrate. In addition, the skin material is laminated on the side of the mat-like fiber structure of the substrate, and thus bonded to the substrate. With the high-melting-point fiber sheet provided as one constituent element of the substrate, the interior trim material can be more easily and simply produced as compared with conventional ones. Namely, when the substrate and the skin material are compressed under pressure by the hot press machine, melted thermoplastic fibers can be prevented from sticking to dies of the hot press machine since the mat-like fiber structure containing thermoplastic fibers is laminated between the skin material and the high-melting-point fiber sheet.

The method of producing an interior trim material according to the present invention includes a laminated structure forming process, a compressing process, a thickness restoring process, and a forming process, but does not include a cooling process in the middle of producing the interior trim material. Thus, the interior trim material can be produced without setting or solidifying the melted thermoplastic fibers, thus eliminating a need to melt the thermoplastic fibers again. This prevents a reduction in the rigidity of the substrate which would otherwise occur due to repeated melting of the thermoplastic fibers. Also, the cooling process is not required, and therefore the time required for producing the interior trim material can be shortened.

Furthermore, according to the method of the present invention, the thermoplastic fibers contained in the mat-like fiber structure may be substantially entirely and sufficiently melted, making it possible to firmly bind the inorganic fibers together, thus assuring improved rigidity of the substrate.

In addition, the method of producing an interior trim materials according to the invention may employ a flat-type hot press machine that provides a flat die surface or surfaces. This allows the laminated structure to be uniformly pressed and compressed. It is therefore possible to cause the melted thermoplastic fibers to bind the inorganic fibers together more uniformly throughout the substrate, thus assuring improved rigidity of the substrate. Also, the melted thermoplastic fibers may penetrate into the high-melting-point fiber sheet so as to bond the mat-like fiber structure integrally with the high-melting-point fiber sheet to form the substrate. In addition, the substrate and the skin material may be firmly bonded to each other over the entire area thereof.

According to the method of the present invention, the laminated structure that has been compressed is naturally or forcibly expanded so as to be given a sufficient thickness, thus assuring sufficient rigidity of the substrate.

In the method of the invention, the laminated structure is formed into an intended shape using a cold press machine in the forming process while the thermoplastic fibers keep plasticity, namely, while the thermoplastic fiber are softened. This may avoid a reduction in the rigidity of the substrate that would otherwise occur due to re-heating of the thermoplastic fibers. Furthermore, since the laminated structure is formed by the cold press machine after it has expanded to a certain thickness, a sufficiently large forming clearance can be provided in the cold press machine. With the thickness of the substrate thus increased, the rigidity of the interior trim material may be further improved.

BRIEF DESCRIPTION OF THE DRAWINGS

FIGS. 2A to 2E are schematic diagrams showing a method of producing an interior trim material according to Examples 1 and 2, in which FIG. 2A shows a process of heating the mat-like fiber structure and the high-melting-point fiber sheet with hot air, FIG. 2B shows a process of laminating a substrate, a thermoplastic resin film, and a skin material on each other, FIG. 2C shows a compressing process, FIG. 2D shows a thickness restoring process, and FIG. 2E shows a forming process;

DETAILED DESCRIPTION OF THE INVENTION

Figure 1:
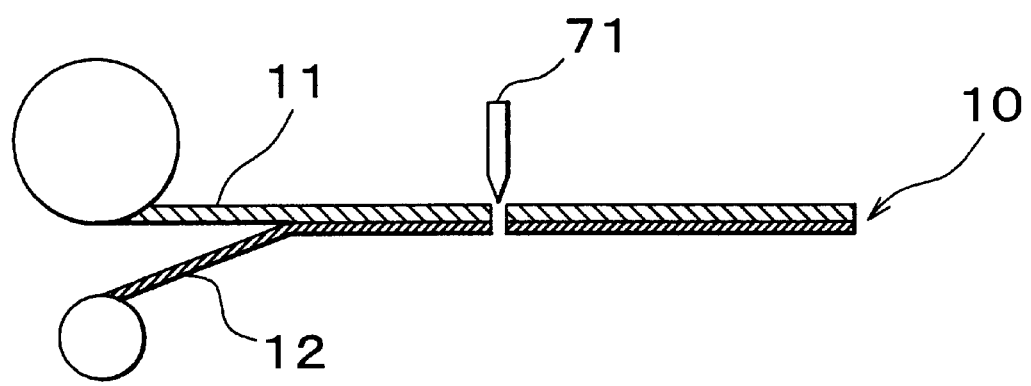
FIG. 1 is a schematic diagram showing a process of supplying and laminating a mat-like fiber structure and a high-melting-point fiber sheet.

The method of producing an interior trim material according to the present invention includes a laminated structure forming process, a compressing process, a thickness restoring process, and a forming process. The interior trim material produced by the method of the present invention has an intended or desired shape, and consists of a substrate and a skin material bonded integrally to the substrate. The method of the present invention will be hereinafter described in greater detail.

Laminated Structure Forming Process

In the laminated structure forming process, a skin material, a mat-like fiber structure formed as a mixture of thermoplastic fibers and inorganic fibers, and a high-melting-point fiber sheet are laminated on each other to be arranged in this order, so as to form a laminated structure in which at least the mat-like fiber structure is heated so that the thermoplastic fibers are melted. The high-melting-point fiber sheet is formed from fibers having a melting point higher than that of the thermoplastic fibers contained in the mat-like fiber structure.

Namely, the laminated structure forming process includes a step of heating at least the mat-like fiber structure to melt the thermoplastic fibers, and a step of laminating the skin material, the mat-like fiber structure, and the high-melting-point fiber sheet on each other in the order of description.

The mat-like fiber structure used herein is prepared by mixing thermoplastic fibers with inorganic fibers and forming the mixture into an intended or desired shape.

Synthetic fibers whose melting point is not excessively high may be used as the thermoplastic fibers. For example, polyethylene fibers, polypropylene fibers, polystyrene fibers, polyester fibers, or the like, may be used. The melting point of the thermoplastic fibers is preferably 200° C. or less, so that the thermoplastic fibers can be easily melted. For example, polypropylene fibers, polyethylene fibers, or low-melting-point polyester fibers may be employed.

As the inorganic fibers, glass fibers, metal fibers, ceramic fibers, carbon fibers, aramid fibers, or other types of fibers may be used. In particular, glass fibers and carbon fibers are preferably used. The fiber diameter of the inorganic fibers ranges from 5 to 20 $\mu$m, preferably, from 9 to 13 $\mu$m.

The mixing ratio of the thermoplastic fibers to the total weight of the thermoplastic fibers and inorganic fibers as represented by 100% ranges from 30 to 70 wt. %, preferably from 40 to 60 wt. %, in view of the rigidity of the substrate.

The thermoplastic fibers and inorganic fibers may be mixed together by a generally known process.

The resultant mixture of the thermoplastic fibers and inorganic fibers is then cut into a mat-like fiber structure of an intended shape using a cutter. It is preferable to perform needle punching on the mixture of the thermoplastic fibers and inorganic fibers so as to give certain mechanical strength to the mat-like fiber structure. The needle punching may be performed before or after cutting of the mixed fibers. In view of formability, however, it is preferable to perform needle punching before cutting. The thickness of the mat-like fiber structure may be controlled to an appropriate value in view of the thickness of the interior trim material to be produced. The density (i.e., mass per unit area) of the mat-like fiber structure may be in the range of 200 to 2000 g/m$^2$, preferably in the range of 300 to 1000 g/m$^2$, to give the substrate a sufficient degree of rigidity.

The high-melting-point fiber sheet is made of fibers with a melting point higher than that of the thermoplastic fibers. For instance, polyethylene terephthalate fibers may be employed as such high-melting-point fibers. Further, the high-melting-point fiber sheet consisting of the high-melting-point fibers may take the form of a spun bond fabric, spun lace nonwoven fabric, woven fabric, or a knitted fabric. The density (i.e., mass per unit area) of the high-melting-point fiber sheet may be in the range of 10 to 50 g/m$^2$, preferably in the range of 10 to 30 g/m$^2$. If the density is too small, it is meaningless to laminate the high-melting-point fiber sheet on the mat-like fiber structure. If the density is too large, on the contrary, the interior trim material becomes too heavy, and it becomes difficult to sufficiently bond the mat-like fiber structure with the high-melting-point fiber sheet.

In the method of producing an interior trim material according to the present invention, the substrate is an integral structure formed by laminating the mat-like fiber structure and the high-melting-point fiber sheet on each other, and bonding them together.

The skin material used in the method of the present invention may take the form of a woven or nonwoven fabric composed of natural fibers, synthetic fibers, or glass fibers, for example, a woven or nonwoven fabric composed of polyester fibers, polypropylene fibers, polyethylene fibers, nylon fibers, rayon fibers, or cellulose fibers. This skin material provides the interior trim material with a design feature. Since the interior trim material is formed into a certain shape, it is preferable that the skin material exhibit sufficient flexibility. The density (i.e., mass per unit area) of the skin material may be in the range of 100 to 600 g/m$^2$, preferably in the range of 100 to 300 g/m². If the density is too low, the design quality of the skin material may deteriorate. If the density is too high, on the other hand, the interior trim material tends to be heavy.

With the mat-like fiber structure, high-melting-point fiber sheet, and the skin material as described above thus prepared, at least the mat-like fiber structure is heated so that the thermoplastic fibers contained in the fiber structure are melted. With this heating step, the thermoplastic fibers contained in the mat-like fiber structure may be sufficiently melted, which leads to thorough and reliable binding of inorganic fibers in the subsequent process step.

In the case where only the mat-like fiber structure is heated, the heating step is followed by a laminating step in which the skin material, the mat-like fiber structure, and high-melting-point fiber sheet are laminated on each other to be arranged in this order so as to form a laminated structure with the thermoplastic fibers being melted therein.

Although only the mat-like fiber structure may be heated, it is preferable to initially laminate the mat-like fiber structure and the high-melting-point fiber sheet on each other, and then heat both the mat-like fiber structure and the high-melting-point fiber sheet. With the laminated structure of the mat-like fiber structure and the high-melting-point fiber sheet thus heated, the thermoplastic fibers melted as a result of the heating can easily enter a joint surface between the mat-like fiber structure and the high-melting-point fiber sheet, thus enhancing a bonding characteristic or strength between the mat-like fiber structure and the high-melting-point fiber sheet. In this case, the mat-like fiber structure is preferably laminated on the high-melting-point fiber sheet such that the latter is located under the former in the direction of the gravity thereof. This is because the melted thermoplastic fibers are more likely to enter the joint surface between the mat-like fiber structure and the high-melting-point fiber sheet due to the gravity. Also, when the high-melting-point fiber sheet and mat-like fiber structure thus laminated is fed to a hot press machine, the mat-like fiber structure may be supported by the high-melting-point fiber sheet, to be thus prevented from hanging down.

Where the mat-like fiber structure and the high-melting-point fiber sheet are laminated on each other and heated, the mat-like fiber structure and high-melting-point fiber sheet thus laminated may be simultaneously subjected to needle punching. The simultaneous needle punching permits the mat-like fiber structure and the high-melting-point fiber sheet to be bonded together with high reliability. Also, the mat-like fiber structure and high-melting-point fiber sheet thus laminated may be cut together. In this case, needle punching is preferably performed before cutting, since the laminated structure can be more easily cut into a desired shape.

After laminating and heating the mat-like fiber structure and the high-melting-point fiber sheet as described above, the skin material is laminated on the resultant laminated structure, such that the skin material, mat-like fiber structure, and the high-melting-point fiber sheet are arranged in this order, to provide a laminated structure with the thermoplastic fibers being melted therein.

It is also possible to initially laminate the skin material, mat-like fiber structure and the high-melting-point fiber in this order, and then heating these laminated fiber sheets altogether, to provide a laminated structure with melted thermoplastic fibers contained in the mat-like fiber structure. In this case, too, the mat-like fiber structure is preferably laminated on the high-melting-point fiber sheet such that the latter is located under the former in the direction of the gravity thereof.

The heating step in the process as described above may be carried out by a suitable means so as to melt all of the thermoplastic fibers contained in the mat-like fiber structure. While a hot air blowing apparatus or a far-infrared heating apparatus may be used for heating, the hot air blowing apparatus is particularly preferred since hot air is passed through the mat-like fiber structure so that the thermoplastic fibers present in the interior of the mat-like fiber structure can be melted in a short time with high reliability. Additionally, the heating with the hot air passing through the fiber structure is unlikely to be influenced by the weight and density (mass per unit area) of the mat-like fiber structure.

When the hot air blowing apparatus is employed, for example, the mat-like fiber structure is placed on a mesh-like net, e.g., a wire netting, so that the hot air blowing apparatus can feed hot air to the mat-like fiber structure. In this case, the hot air is passed through the entire volume of the mat-like fiber structure to heat the whole mat-like fiber structure, thereby to melt the thermoplastic fibers contained therein. This may accomplish uniform heating throughout the structure and reduction in the heating time. Upon heating, the peripheral edges of the mat-like fiber structure are preferably pinched by clamps because the original shape of the mat-like fiber structure needs to be maintained even with the hot air passing through the entire volume of the mat-like fiber structure.

When the mat-like fiber structure is laminated on the high-melting-point fiber sheet, it is preferable to feed hot air in the direction from the mat-like fiber structure to the high-melting-point fiber sheet. In this manner, the hot air passes through the mat-like fiber structure first, and then through the high-melting-point fiber sheet, thus causing the thermoplastic fibers melted by the hot air to enter a joint surface with the high-melting-point fiber sheet. This leads to an improved bonding characteristic between the mat-like fiber structure and the high-melting-point fiber sheet.

Preferably, the temperature of the hot air is made higher by about 30° C. than the melting point of the thermoplastic fibers, since the hot air is required to melt and soften the thermoplastic fibers. Where the mat-like fiber structure is laminated on the high-melting-point fiber sheet, the hot air temperature needs to be set to be lower than the melting point of the high-melting-point fibers. If the temperature is set higher than the melting point of the high-melting-point fibers, the high-melting-point fibers are melted, and the lamination of the high-melting-point fiber sheet becomes pointless or meaningless. The hot air blowing time may be generally within the range of 10 to 120 seconds, since such a period of time is sufficient to melt the thermoplastic fibers.

In order to provide a reliable bonding characteristic between the skin material and the substrate, the skin material may be coated with an appropriate adhesive as needed. Preferably, an adhesive layer is provided between the skin material and the substrate. When the laminated structure is compressed under pressure in the compressing process, the melted thermoplastic fibers contained in the mat-like fiber structure serve to bond the substrate and the skin material. If the bonding strength provided by the melted thermoplastic fibers is not sufficient, an adhesive layer is interposed between the skin material and the mat-like fiber structure, so as to increase the bonding strength between the skin material and the mat-like fiber structure. Thus, a firmly bonded, integral assembly of the skin material and the substrate can be provided.

While the adhesive layer may be formed of any suitable material, a thermoplastic resin film, an adhesive composed of thermoplastic resin, or the like, may be used for forming the adhesive layer. The thermoplastic resin film may be laminated between the skin material and the mat-like fiber structure, or may be formed on the back surface of the skin material. The adhesive may be applied by coating to the skin material. Where thermoplastic resin film or the adhesive composed of thermoplastic resin is used, the thermoplastic resin is melted through heating in the laminated structure forming process or by the hot press machine used in the compressing process, thereby to firmly bond the skin material with the substrate.

The thermoplastic resin film may be suitably selected from, for example, polyethylene film, polypropylene film, polystyrene film, saturated polyester film, polyurethane film, polyvinyl butyral film, vinyl chloride film and others.

The adhesive made of thermoplastic resin may be selected from, for example, an acrylic resin-based adhesive, a polyurethane-based adhesive, an elastomer-based adhesive and other types of adhesives.

The adhesive layer may be interposed between the skin material and the mat-like fiber structure before heating of at least the mat-like fiber structure, so that the adhesive layer and the mat-like fiber structure can be heated together. Alternatively, the adhesive layer may be interposed after heating of at least the mat-like fiber structure.

The adhesive layer is preferably provided by a thermoplastic resin film that is melted at a temperature lower than the melting point of the skin material. This is because the skin material and the substrate can be bonded integrally with each other with the thermoplastic resin film melted at a temperature lower than the melting point of the skin material, without melting the skin material. Furthermore, the thermoplastic resin film exists uniformly over the entire area of the interface between the skin material and the substrate, and therefore the thermoplastic resin melted upon pressing by the hot press machine can uniformly bond the skin material and the substrate. Moreover, the nonwoven fabric used as the skin material is likely to be impregnated with the thermoplastic resin when the film is being melted, resulting in improved Taber abrasion resistance.

Where a nonwoven fabric was used as the skin material, its surface was coated with resin or the nonwoven fabric was blended with thermoplastic resin for the purpose of satisfying required Taber abrasion resistance. To this end, heat setting was required to be done during production of the skin material so as to melt and then solidify the resin. If the thermoplastic resin film as described above is used, those process steps of pre-coating the nonwoven fabric with resin or heat setting may be eliminated, thus reducing the manufacturing cost. Here, Taber abrasion resistance is to be interpreted as an index representing falling-off of fibers from the skin material when a design surface of the resulting formed article is abraded or rubbed.

It is further preferable to use thermoplastic resin with a melt index in the range of 1 to 3 for forming the thermoplastic resin film. If the melt index exceeds this range, the thermoplastic resin flows out onto the design surface of the skin material, thus deteriorating the design quality of the skin material. If the melt index is below the range, on the other hand, the thermoplastic resin fails to penetrate into the skin material because of high viscosity, and thus fails to improve the Taber abrasion resistance. For example, polyethylene film, polypropylene film, or the like, may be used as the thermoplastic resin film.

The thickness of the thermoplastic resin film may be appropriately determined taking account of the thickness of the skin material, the melt index of the thermoplastic resin film, and other factors. The film thickness is generally in the range of 10 to 35 mm, preferably in the range of 10 to 25 mm. If the film thickness is too small, the bonding strength between the skin material and the substrate may be reduced. If the film thickness is too large, on the other hand, the weight is increased, and the design quality of the skin material may deteriorate. The thermoplastic resin is expected to proceed into the skin material to the extent that would prevent fibers of the skin material from coming off when the design surface of the skin material is abraded or rubbed. Namely, the thermoplastic resin is not required to permeate through the skin material until it appears on the design surface.

As a method of interposing the thermoplastic resin film between the mat-like fiber structure and the skin material, the thermoplastic resin film may be laminated on the mat-like fiber structure, and the skin material may be further laminated on the resin film. Alternatively, the thermoplastic resin film may be formed on the back surface of the skin material so that the resin film is interposed between the skin material and the mat-like fiber structure.

The thermoplastic resin film may first be laminated on the mat-like fiber structure, and then heated together with the fiber structure. Alternatively, the mat-like fiber structure may first be heated, on which the thermoplastic resin film is laminated. If the thermoplastic resin film is laminated on the mat-like fiber structure after heating thereof, the thermoplastic resin film is melted by a hot press machine.

It is also possible to interpose a high-melting-point layer, such as a nylon layer, that is not likely to melt, between strips of the thermoplastic resin film. The high-melting-point layer that is not likely to melt serves to prevent air from passing through the formed article, and avoid contamination of the skin material. Preferably, such a high-melting-point layer, such as a nylon layer, that is not likely to melt is interposed between strips of the thermoplastic resin film, after at least the mat-like fiber structure is heated. This is because hot air cannot be caused to pass through the mat-like fiber structure in the presence of the layer that is not melted by heating.

Compression Process

In the compression process, a laminated structure formed in the laminated structure forming process is compressed under pressure by means of a flat-type hot press machine. In this process, the melted thermoplastic fibers adhere to bonded portions of inorganic fibers so as to be firmly bind these fibers together, assuring sufficiently high rigidity of the substrate. The thermoplastic fibers also enter the joint surface or interface between the mat-like fiber structure and the high-melting-point fiber sheet, so as to bond these fiber sheets together, to provide a substrate consisting of the mat-like fiber structure and the high-melting-point fiber sheet. Then, the substrate and the skin material are firmly bonded into an integral structure by the melted thermoplastic fibers and an appropriate amount of adhesive.

The laminated structure formed in the laminated structure forming process is compressed under pressure and heat by the flat-type hot press machine. The flat-type hot press machine may consist of upper and lower dies in the form of flat plates. With this hot press machine, the laminated structure is compressed under pressure and heat between the upper and lower dies. The use of the flat-type hot press machine makes it possible to uniformly compress under pressure the mat-like fiber structure, high-melting-point fiber sheet, and the skin material. As a result, the inorganic fibers can be uniformly bound together, and the mat-like fiber structure and the high-melting-point fiber sheet can be uniformly bonded over the entire surfaces. Furthermore, the substrate and the skin material can be uniformly bonded over the entire surfaces.

Where an adhesive layer, such as a thermoplastic resin, is interposed between the substrate and the skin material, the substrate and the skin material are compressed under pressure with the adhesive layer interposed therebetween, to be more firmly bonded together into an integral structure.

When the thermoplastic resin film is used as the adhesive layer, the compression under pressure by the hot press machine makes it easy to impregnate the nonwoven fabric used as the skin material with the thermoplastic resin, thus assuring improved Taber abrasion resistance.

The laminated structure to be compressed under pressure may be placed in the hot press machine such that the skin material is located on the upper side and the high-melting-point fiber sheet is located on the lower side. If the mat-like fiber structure is heated with the high-melting-point fiber sheet laminated on its bottom, the resultant laminated structure will have the high-melting-point fiber sheet formed on its bottom. The order of laminated fiber sheets, however, may be reversed.

If the laminated structure is placed in the hot press machine such that the skin material is located on the upper side, the temperature of the upper die of the hot press machine may be set to be lower than at least the melting point of the skin material. This is because the skin material will be melted if the temperature of the upper die is higher than the melting point thereof If the thermoplastic resin film is interposed as described above, the temperature of the upper die has to be higher than the melting point of the thermoplastic resin film. If the thermoplastic resin film is not interposed, the temperature is preferably set to be higher than the melting point of the thermoplastic fibers contained in the substrate. The skin material and the substrate can be bonded by the thermoplastic fibers through compression under pressure at the temperature lower than the melting point of the skin material but higher than the melting point of the thermoplastic fibers.

The temperature of the upper die of the hot press machine is preferably in the range of 100° C. to 150° C. in the case where the skin material is placed in contact with the upper die of the hot press machine. If the temperature exceeds this range, the skin material softens, and the pile of the skin material may be flattened when compressed under pressure, resulting in degraded design quality of the skin material. If the temperature is below this range, on the contrary, the thermoplastic fibers and thermoplastic resin film cannot be kept plasticized, resulting in insufficient bonding between the skin material and the substrate.

The temperature of the lower die of the hot press machine may be set to an appropriate level that is lower than the melting point of the high-melting-point fiber but higher than the melting point of the thermoplastic fibers contained in the mat-like fiber structure. This is because the thermoplastic fibers need to be melted and softened so as to provide reliable bonding between the thermoplastic fibers and inorganic fibers of the substrate when compressed under pressure. In the presence of the high-melting-point fiber sheet laminated, it is necessary to set the temperature of the lower die of the hot press machine to be lower than the melting point of the high-melting-point fibers. If the temperature is higher than the melting point of the high-melting-point fibers, the high-melting-point fibers are melted, and the use of the high-melting-point fiber sheet becomes meaningless.

The high-melting-point fiber sheet and the skin material prevent the thermoplastic fibers from sticking to the upper and lower dies of the hot press machine. It is, however, preferable to apply Teflon coating to the upper and lower dies of the hot press machine so as to prevent the molten thermoplastic fibers from sticking to the dies.

The pressure applied by the hot press machine can be controlled to an appropriate level in view of the materials and quantities of the skin material and substrate, the melt index of the thermoplastic resin film, and other factors. Normally, the hot press may be performed with a pressure in the range of 490 to 1960 kPa. The pressure exceeding this range does not lead to an improved bonding effect. The pressure that is below this range, on the other hand, may result in insufficient bonding between the substrate and the skin material, and insufficient binding of inorganic fibers.

Preferably the compression is carried out under a pressure in the range of ges from 490 to 980 kPa. If the pressure is higher than this range, the pile of the skin material that has been softened by heating may be flattened, and the design quality of the skin material may deteriorate.

The pressing time of the hot press machine can be suitably controlled in view of the materials and quantities of the skin material and substrate in use, and other factors. Normally, the press time is in the range of 1 to 10 seconds, preferably in the range of 1 to 5 seconds. If the press time is too short, the thermoplastic resin film may be insufficiently melted. If the press time is too long, on the contrary, the melted thermoplastic resin film and thermoplastic fibers may be moved in the direction of the gravity, i.e., downward, resulting in insufficient bonding between the substrate and the skin material, or uneven distribution of the thermoplastic fibers and inorganic fibers in the substrate.

Thickness Restoring Process

In the thickness restoring process, the laminated structure that has been compressed under pressure is naturally or forcibly expanded so as to restore a certain thickness. Namely, the compressed laminated structure is expanded to a certain thickness while the thermoplastic fibers are being given plasticity. With this process, the laminated structure can restore at least part of its original thickness, to provide sufficient rigidity, and can be formed into an intended shape in the following step by means of a cold press machine.

In this case, it is preferable to expand the laminated structure to a thickness that is substantially equivalent to that of the mat-like fiber structure before heating. If the resulting thickness becomes larger than this, the binding of the inorganic fibers may be loosened or eliminated. If the resulting thickness is smaller than that of the mat-like fiber structure, the laminated structure cannot provide sufficient rigidity.

The laminated structure may be left or let stand, to be naturally expanded, or may be expanded by certain force. For example, the laminated structure may be sucked or pulled under vacuum from the upper die of the hot press machine, or may be swollen with hot air fed into the mat-like fiber structure from the lower die.

Forming Process

In the forming process, the laminated structure that has restored its thickness while the thermoplastic fibers keeps its plasticity is formed by a cold press machine into a certain shape. Thus, an interior trim material having a desired shape can be formed by cold-pressing the expanded laminated structure before the thermoplastic fibers loses plasticity. Since cold pressing is carried out while the thermoplastic fibers remain soft or easily deformable, it is possible to form the laminated structure into more complicated shapes than before.

Forming dies that are suitable for forming the desired shape may be used in the cold press machine, the temperature of which may be in the range of 20 to 50° C.

EXAMPLES

Referring to FIG. 1 and FIG. 2A through FIG. 2E, Example 1 will be described. For comparison with an interior trim material produced in Example 1, interior trim materials were produced in Comparative Example 1 and Comparative Example 2 according to other methods. The interior trim materials produced in Example 1, Comparative Example 1, and Comparative Example 2 have basically the same shape except the thickness for the purpose of comparison.

Example 1

Initially, a substrate 10 consisting of a mat-like fiber structure 11 and a high-melting-point fiber sheet 12 was prepared by the following process. Polypropylene fibers (melting point: 165° C.) as one type of thermoplastic fibers and glass fibers as one type of inorganic fiber were blended and subjected to needle punching so as to form the mat-like fiber structure 11 having a thickness of 7 mm, a width of 1400 mm, and a density (i.e., mass per unit area) of 530 g/m$^2$. The high-melting-point fiber sheet 12 having a width of 1400 mm was prepared from a spun bond fabric (density: 30 g/m$^2$, thickness: 0.5 mm) that is made up of long fibers of polyethylene terephthalate fibers (melting point: 250° C). As shown in FIG. 1, the spun bond fabric as the high-melting-point fiber sheet 12 was laminated on the back surface of the mat-like fiber structure 11, and the mat-like fiber structure 11 and the spun bond fabric thus laminated were cut to a length of 1800 mm with a cutter 71. As a result, a substrate 10 consisting of the mat-like fiber structure 11 and the high-melting-point fiber sheet 12 was prepared.

As shown in FIG. 2A, the substrate 10 thus produced was placed on a wire net 72 such that the periphery of the substrate 10 was gripped by a clamp 70. A hot air blowing apparatus (not shown) was used to cause hot air (220° C.) to blow into the mat-like fiber structure 11 for 15 seconds so that the hot air is forced to pass through the entire volume of the substrate 10 until it reaches the spun bond fabric. As a result, only the polypropylene fibers contained in the substrate 10 were melted, and entered a joint surface between the mat-like fiber structure 11 and the spun bond fabric. This resulted in an improved bonding characteristic between the mat-like fiber structure 11 and the spun bond fabric as the high-melting-point fiber sheet 12.

Figure 4:
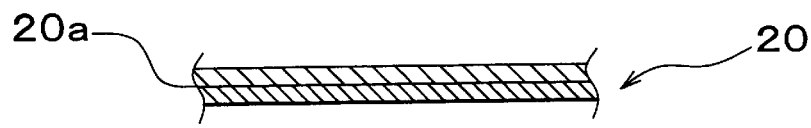
FIG. 4 is a view schematically showing the construction of the thermoplastic resin film used in Examples 1 and 2.

Referring next to FIG. 2B, the substrate 10 heated as described above was placed on a flat lower die 52 of a hot press machine 50 such that the spun bond fabric as the high-melting-point fiber sheet 12 faces the lower die 52. A polyethylene (melting point: 115° C.) adhesive film (thickness: 15 $\mu$m) serving as a thermoplastic resin film 20 and having a non-melting layer 20a made of nylon as an intermediate layer was prepared as shown in FIG. 4. The polyethylene adhesive film 20 was laminated on the front surface of the substrate 10. Furthermore, a nonwoven fabric (mass per unit area: 160 g/m$^2$) serving as a skin material 30 and formed from polyethylene terephthalate fibers (melting point: 250° C.) was laminated on the polyethylene adhesive film, to provide a laminated structure 40.

Referring next to FIG. 2C, the laminated structure 40 consisting of the substrate 10, the polyethylene adhesive film (20), and the nonwoven fabric (30) of polyethylene terephthalate was compressed under pressure, while being heated, by an upper die 51 and a lower die 52 of the flat-type hot press machine 50. The stamping pressure was 686 kPa. The temperature of the upper die 51 of the hot press machine 50 was 140° C., while that of the lower die 52 of the hot press machine 50 was 200° C. Through the compression under pressure by means of the hot press machine 50, the polyethylene adhesive film (20) was melted, and the mat-like fiber structure 11 was impregnated with the melted polyethylene adhesive, to assure certain rigidity of the substrate 10. At the same time, the substrate 10 and the skin material 30 were firmly bonded together over the entire surfaces thereof.

Subsequently, the compressed laminated structure 40 was let stand for about 10 seconds so as to be expanded until the thickness of the laminated structure 40 became equal to 7 mm, as shown in FIG. 2D.

As shown in FIG. 2E, while the polypropylene fibers as the thermoplastic fibers contained in the laminated structure 40 and the polyethylene adhesive film as the thermoplastic resin film 20 maintained plasticity, the laminated structure 40 was formed into an interior trim material 100 of a desired shape, by means of a cold press machine 60 in which the temperature of the upper and lower dies was set at 30° C. The thickness of the resulting interior trim material 100 was 5 mm.

Comparative Example 1

Polypropylene fibers (melting point: 165° C.) and glass fibers were blended into a fiber structure having a density of 550 g/m$^2$, and the fiber structure was subjected to needle punching, to provide a mat-like fiber structure having a thickness of 7 mm and a width of 1400 mm. On the mat-like fiber structure was laminated a polyethylene (melting point: 115° C.) adhesive film (thickness: 35 mm) having a non-melting layer made of nylon as an intermediate layer, which film is the same as that used in Example 1. The laminated mat-like fiber structure and polyethylene adhesive film were fed continuously to an endless belt, and heated in a 200° C. heating furnace for 120 seconds. The laminated structure was then compressed under pressure by a pressing portion provided on the endless belt and having flat-type dies kept at 200° C., so that the mat-like fiber structure was impregnated with the polyethylene adhesive film. Thereafter, the laminated structure was let stand for 3 seconds, thereby restoring the thickness thereof to 7 mm. The laminated structure was then cooled for 6 seconds at a 25° C. cooling portion provided on the endless belt so that the polyethylene adhesive film and polypropylene fibers were set or solidified. The mat-like fiber structure was then cut to a certain length, to thus provide a substrate formed from the mat-like fiber structure.

Subsequently, a nonwoven fabric (mass per unit area: 160 g/m$^2$) formed of polyethylene terephthalate fibers (melting point: 250° C.) and serving as a skin material was laminated on the substrate formed from the mat-like fiber structure. The skin material was then tentatively attached to the substrate by thermally fusing four points on the edges thereof. The polypropylene fibers and the polyethylene adhesive film were thereafter melted again in the 200° C. heating furnace, and an interior trim material having a desired shape was formed by a cold press machine kept at 30° C. The thickness of the resulting interior trim material was 4 mm.

Comparative Example 2

Polypropylene fibers (melting point: 165° C.) and glass fibers were blended into a fiber structure having a density of 550 g/m$^2$, and the fiber structure was subjected to needle punching, to provide a mat-like fiber structure having a thickness of 7 mm and a width of 1400 mm. The mat-like fiber structure was cut to a length of 1800 mm with a cutter, to thus produce a substrate consisting of the mat-like fiber structure. This substrate was clamped at its periphery, and a hot air blowing apparatus was used to feed hot air (220° C.) to the substrate for 15 seconds so that the hot air passes through the entire volume of the substrate consisting of the mat-like fiber structure. As a result, only the polypropylene fibers were melted.

Subsequently, there was prepared a polyethylene (melting point: 115° C.) adhesive film (thickness: 35 mm) having a non-melting layer made of nylon as an intermediate layer, which film is the same as that used in Example 1. The polyethylene adhesive film was then heated along with a nonwoven fabric (mass per unit area: 160 g/m$^2$) composed of polyethylene terephthalate fibers (melting point: 250° C.) so that the adhesive film was bonded to the back surface of the nonwoven fabric. Then, while the polyethylene adhesive film remains in a molten state, the nonwoven fabric composed of polyethylene terephthalate fibers and serving as a skin material was laminated on the substrate consisting of the mat-like fiber structure, thereby to provide a laminated structure.

While the mat-like fiber structure and the adhesive layer maintain their plasticity, the laminated structure as described above was formed into an interior trim material having a desired shape, using a cold press machine with upper die and lower die of certain shapes being set to 30° C. The thickness of the resulting interior trim material was 4 mm.

Test

The interior trim materials formed in Example 1, Comparative Example 1, and Comparative Example 2 were evaluated in terms of the bonding strength between the substrate and the skin material, rigidity of the interior trim material, and the presence of creases on the skin material. Table 1 shows the results of the test.

The bonding strength was measured in the following manner. Initially, five test specimens were taken from each type of the interior trim materials to be tested, such that each specimen had a width of 25 mm and a length of 150 mm. A part of the skin material having a length of 50 mm was then peeled off from each test specimen. With the peeled part of skin material and substrate attached to gripping portions of a tensile testing machine, the rest of the skin material was peeled off from the substrate at a rate of 200 mm/min. The average of the maximum values of the chart obtained was reported as the bonding strength.

The rigidity was measured as follows. First of all, five test specimens each having a width of 50 mm and a length of 150 mm were taken from each of the interior trim materials to be tested. Each specimen was them tested on a three-point bending testing machine at a test speed of 50 mm/min. The bending modulus gradient was obtained from the initial gradient of the chart obtained, and the average of the gradients was reported as rigidity.

The presence of creases on the skin materials was evaluated in the following manner. The number of creases on the skin material was counted by visually checking each of the interior trim materials tested. A test specimen was rated as O if the number of creases was less than 5, rated as Δ if the same number was between 5 and 10, and was rated as X if the number was more than 10. It is, however, to be noted that occurrence of creases is greatly affected by the shape of the interior trim material, and therefore the evaluation was performed on the interior trim materials having the same shape and produced according to Example 1, Comparative Example 1, and Comparative Example 2.

TABLE 1

|  | Bonding strength (N/25 mm) | Rigidity (N/50 mm/cm) | Creases on skin material |
|---|---|---|---|
| Example 1 | 25 | 40 | O |
| Comparative Example 1 | 15 | 25 | Δ |
| Comparative Example 2 | 5 | 7 | Δ |

As can be understood from Table 1, the interior trim material of Example 1 was superior to those of Comparative Example 1 and Comparative Example 2 in all aspects of the bonding strength, rigidity, and creases on the skin material.

Modified Example of Example 1

In Example 1, the compressed laminated structure 40 was let stand thereby to be naturally expanded to restore its thickness. However, the laminated structure 40 may be expanded after compression by using the upper die of the hot press machine for sucking the laminated structure under vacuum, or feeding hot air to the laminated structure from the lower die of the hot press machine.

Figure 3A:
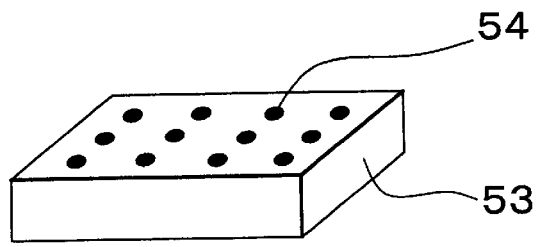
FIGS. 3A to 3C are schematic diagrams showing a die of a hot press machine used for forcibly expanding the laminated structure in the direction of its thickness, and two different manners of expanding the laminated structure, respectively.
Figure 3B:
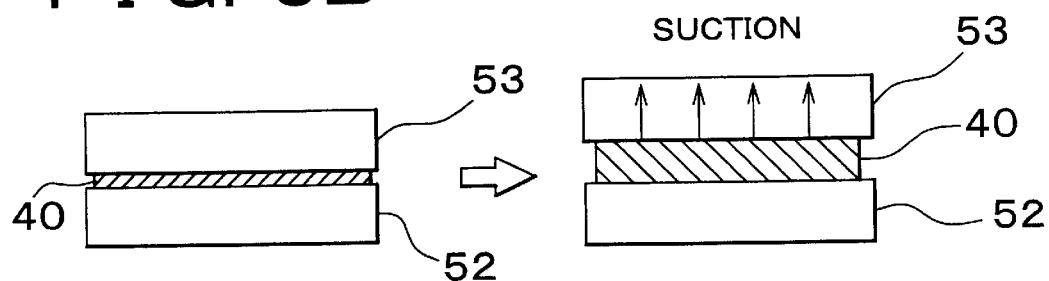
Figure 3C:
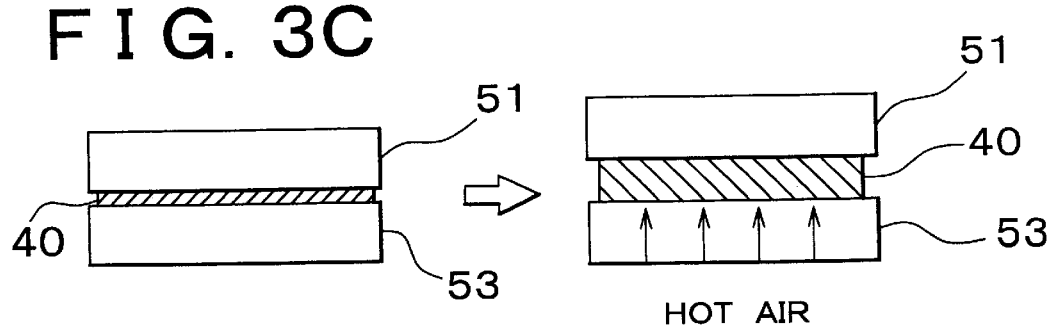

FIG. 3A shows a die 53 of a hot press machine having vent holes 54 formed therein. The die 53 having the vent holes 54 can be used for both the upper and lower dies of the hot press machine.

Where the die 53 having vent holes 54 therein is used as an upper die as shown in FIG. 3B, the laminated structure 40 is expanded in the direction of the thickness by suction through the vent holes 54 formed in the die 53. In this case, if the thermoplastic resin film 20 has a non-melting layer made of, for example, nylon as an intermediate layer as in Example 1, the non-melting layer functions as an air blocking layer to enable sucking of the laminated structure 40.

Where the die 53 having vent holes 54 therein is used as a lower die as shown in FIG. 3C, hot air can be caused to blow through the vent holes 54 of the die 53 so as to expand the laminated structure 40 in the direction of its thickness.

Example 2

Referring to FIG. 1 and FIG. 2A through FIG. 2E, Example 2 will be now described. Since the processes of Example 2 are basically the same as those of Example 1, the same figures as those used for Example 1 will be used. In these figures, the same reference numerals are used for identifying the same elements.

Initially, a substrate 10 consisting of a mat-like fiber structure 11 and a high-melting-point fiber sheet 12 was prepared by the following process. Polypropylene fibers (melting point: 165° C.) as one type of thermoplastic fibers and glass fibers as one type of inorganic fiber were blended and subjected to needle punching so as to form the mat-like fiber structure 11 having a thickness of 7 mm, a width of 1400 mm, and a density (i.e., mass per unit area) of 575 g/m². The high-melting-point fiber sheet 12 having a width of 1400 mm was prepared from a spun bond fabric (density: 30 g/m², thickness: 0.5 mm) made up of long fibers of polyethylene terephthalate fibers (melting point: 250° C.). As shown in FIG. 1, the spun bond fabric as the high-melting-point fiber sheet 12 was laminated on the back surface of the mat-like fiber structure 11, and the mat-like fiber structure 11 and the spun bond fabric thus laminated were cut to a length of 1800 mm with a cutter 71. As a result, a substrate 10 consisting of the mat-like fiber structure 11 and the high-melting-point fiber sheet 12 was prepared.

As shown in FIG. 2A, the substrate 10 thus produced was placed on a wire net 72 such that the periphery of the substrate 10 was gripped by a clamp 70. A hot air blowing apparatus (not shown) was used to cause hot air (220° C.) to blow into the mat-like fiber structure 11 for 15 seconds so that the hot air is forced to pass through the entire volume of the substrate 10 until it reaches the spun bond fabric. As a result, only the polypropylene fibers contained in the substrate 10 were melted, and entered a joint surface between the mat-like fiber structure 11 and the spun bond fabric. This resulted in an improved bonding characteristic between the mat-like fiber structure 11 and the spun bond fabric as the high-melting-point fiber sheet 12.

Referring next to FIG. 2B, the substrate 10 heated as described above was placed on a flat lower die 52 of a hot press machine 50 such that the spun bond fabric as the high-melting-point fiber sheet 12 faces the lower die 52. A polyethylene (melting point: 115° C.) adhesive film (thickness: 15 μm) serving as a thermoplastic resin film 20 and having a non-melting layer 20a made of nylon as an intermediate layer was prepared as shown in FIG. 4. The polyethylene adhesive film 20 was laminated on the front surface of the substrate 10. Furthermore, a nonwoven fabric (mass per unit area: 150 g/m²) formed from polyester fibers and having no resin coating was laminated as a skin material 30 on the polyethylene adhesive film. The melt index of the polyethylene adhesive film was 2.

Referring next to FIG. 2C, the substrate 10, the polyethylene adhesive film (20), and the nonwoven fabric (30) of polyester fibers thus laminated were compressed under pressure, while being heated, by upper die 51 and lower die 52 of the flat-type hot press machine 50. The stamping pressure was 696 kPa. The temperature of the upper die 51 of the hot press machine 50 was 130° C., while that of the lower die 52 of the hot press machine 50 was 200° C. Through the compression under pressure by means of the hot press machine 50, the polyethylene adhesive film (20) was melted, and the mat-like fiber structure 11 was impregnated with the melted polyethylene adhesive, to assure certain rigidity of the substrate 10. At the same time, the substrate 10 and the skin material 30 were firmly bonded together over the entire surfaces thereof, to provide a laminated structure 40. In addition, the skin material was also impregnated with the melted polyethylene adhesive film.

Subsequently, the compressed laminated structure 40 was let stand for about 10 seconds so as to be expanded until the thickness of the laminated structure 40 became equal to 7 mm, as shown in FIG. 2D.

As shown in FIG. 2E, while the polypropylene fibers as the thermoplastic fibers contained in the laminated structure 40 and the polyethylene adhesive film as the thermoplastic resin film 20 maintained plasticity, the laminated structure 40 was formed into an interior trim material 100 of a desired shape, by means of a cold press machine 60 in which the temperature of the upper and lower dies was set at 30° C. The thickness of the resulting interior trim material 100 was 5 mm.

Comparative Example 3

An interior trim material was produced according to a method of Comparative Example 3, which is the same as that of Comparative Example 1 except that a nonwoven fabric (mass per unit area: 150 g/m²) that was not coated with resin was used as the skin material as in Example 2.

Test and Evaluation

The interior trim material produced in Example 2 was tested on a Taber abrasion tester, and the result was that the Taber abrasion grade of this interior trim material was 4, namely, falling-off of fibers at the surface of the trim material due to abrasion was not so apparently observed. The same test was conducted on the interior trim material produced in Comparative Example 3, and the result was that the Taber abrasion grade was 1, namely, falling-off of fibers at the surface of the trim material due to abrasion was conspicuously noticeable.

What is claimed is:

1. A method of producing an interior trim material, comprising, in order the steps of:

cutting a skin material, a fiber mat structure and a high-melting-point fiber sheet into a desired shape, said fiber mat structure being prepared by blending thermoplastic fibers and inorganic fibers, said high-melting-point fiber sheet comprising high-melting-point fibers having a melting point higher than that of the thermoplastic fibers of the fiber mat structure;

heating at least said fiber mat structure such that the thermoplastic fibers are melted, after cutting;

forming a laminated structure with the thermoplastic fibers being melted therein, after heating, in which the skin material is laminated on one side of the fiber mat structure and the high-melting-point fiber sheet is laminated on the other side of the fiber mat structure;

compressing the laminated structure under pressure by a flat-type hot press machine, after forming;

causing or allowing expansion of the laminated structure that has been compressed, after compressing, so as to restore at least part of the thickness thereof, and forming the laminated structure into a certain shape by a cold press machine while the thermoplastic fibers of the fiber mat structure maintain plasticity, after expanding, wherein the laminated structure is not reheated after compression.

2. A method according to claim 1, wherein said step of heating the fiber mat structure comprises a sub-step of laminating the high-melting-point fiber sheet on the lower surface of the fiber mat structure as viewed in the direction of the gravity.

3. A method according to claim 2, wherein in the step of heating the laminated high-melting-point fiber and the fiber mat structure, hot air is caused to pass through the fiber mat and the high-melting-point fiber sheet in a direction from the fiber mat structure toward the high-melting-point fiber sheet.

4. A method according to claim 1, wherein a die of the flat-type hot press machine that contacts the high-melting point fiber sheet is controlled to be higher temperature than the die of the flat-type hot press machine that contacts the skin material and the die of the flat-type hot press machine that contacts the skin material is controlled to a temperature in a range of 100° C. to 150° C. when the laminated structure is compressed under pressure.

5. A method according to claim 4, wherein a pressure applied by the flat-type hot press machine in the step of compressing the laminated structure is controlled to be in a range of 490 kPa to 980 kPa.

6. A method according to claim 5, wherein said step of forming a laminated structure comprises a sub-step of interposing a bonding layer between the material and the fiber mat structure.

7. A method according to claim 6, wherein said bonding layer comprises thermoplastic resin.

8. A method according to claim 7, wherein said thermoplastic resin has a melt index of 1 to 3.

9. A method according to claim 4, wherein said step of forming a laminated structure comprises a sub-step of interposing a bonding layer between the skin material and the fiber mat structure.

10. A method according to claim 9, wherein said bonding layer comprises thermoplastic resin.

11. A method according to claim 10, wherein said thermoplastic resin has a melt index of 1 to 3.

12. A method according to claim 1, wherein a pressure applied by the flat-type hot press machine in the step of compressing the laminated structure is controlled to be in a range of 490 kPa to 980 kPa.

13. A method according to claim 1, wherein said step of forming a laminated structure comprises a sub-step of interposing a bonding layer between the skin material and the fiber mat structure.

14. A method according to claim 13, wherein said bonding layer comprises thermoplastic resin.

15. A method according to claim 14, wherein said thermoplastic resin has a melt index of 1 to 3.

16. A method according to claim 1, wherein the melted thermoplastic fibers and the high-melting point fiber sheet are bonded by being pressed by the flat hot press machine.

17. A method according to claim 1, wherein the laminated structure is such that the fiber mat structure and the high-melting point fiber sheet directly contact each other.

18. A method according to claim 1, wherein the bonding between the fiber mat structure and the high-melting point fiber sheet is solely achieved by the fiber mat structure and the high-melting point fiber sheet.

* * * * *